April 4, 1967 F. MACHADO, JR., ET AL 3,312,792

MATRIX SWITCH WITH IMPROVED CONTACT ACTUATOR MEANS

Filed Jan. 28, 1966 3 Sheets-Sheet 1

INVENTORS
FRANK MACHADO, JR.
ROBERT E. MOORE
ERIC R. WOODS
BY Nicolas DeVogel
AGENT

MATRIX SWITCH WITH IMPROVED CONTACT ACTUATOR MEANS

Filed Jan. 28, 1966 3 Sheets-Sheet 2

INVENTORS
FRANK MACHADO JR.
ROBERT E. MOORE
ERIC R. WOODS
BY
AGENT

INVENTORS
FRANK MACHADO JR.
ROBERT E. MOORE
ERIC R. WOODS
BY
AGENT 3,312,792

MATRIX SWITCH WITH IMPROVED CONTACT ACTUATOR MEANS

Frank Machado, Jr., Robert E. Moore, and Eric R. Woods, San Diego, Calif., assignors to General Dynamics Corporation, San Diego, Calif., a corporation of Delaware Filed Jan. 28, 1966, Ser. No. 523,763
4 Claims. (Cl. 200—5)

The present invention relates to a matrix switch with imposed contact actuator means and more particularly to an improved contact array of switching elements operably mounted on an X-Y grid structure of metallic tubes or the like.

In particular, the matrix switch described hereinafter is of significant value for programming of systems and provides a superior order of isolation between connected circuits and adjacent circuits in signal switching complexes wherein minimization of cross-talk is a major consideration.

The invention comprises a system for reducing cross-talk in a matrix switch assembly by employing a plurality of metallic tubes, channel or the like providing elements which are electrically bonded together to form a homogeneous assembly consisting of two groups of parallel passages. The major axis of each group is perpendicular to that of the other group and each passage carries a conventional two-wire conductor line arrangement, the resulting X-Y grid structure greatly reducing cross-talk between lines. The switching operation is carried out by means of a rotary quill or spindle interconnect mechanism provided at each X and Y cross-over junction, the mechanism selectively interconnecting the X and Y line pairs as desired. Manual or remote automatic actuation of the quills as by the use of appropriate rack and pinion mechanism is contemplated.

The achievement of exceptionally low cross-talk at high frequencies is due to the utilization of techniques conducive to the effective containment and/or cancellation of energy fields associated with the signal carrying elements of this switch assembly.

It is therefore an object of the present invention to provide a matrix switching network for accomplishing rapid multi-point switching of radio frequency energy while maintaining low cross-talk between unconnected circuits.

It is a further object of the present invention to provide a matrix switching network having a superior order of isolation between connected circuits and adjacent circuits in signal switching complexes wherein cross-talk is reduced to a minimum.

Other objects and advantages of this invention will become fully apparent from the following detailed description taken in conjunction with the accompanying drawings which illustrate and clarify the preferred embodiments and in which:

FIGURE 1 presents an isometric view of the first preferred embodiment of a structural assembly, forming an X-Y grid structure, for matrix switching networks.

FIGURE 2 shows in isometric fashion a second preferred structural embodiment comprising a plurality of tubes perpendicularly mounted with one another.

FIGURE 3 presents a pictorial view of insulation blocks supporting conductors.

In general the matrix switching mechanism comprises at least two ducts of conductive shielding material mounted in a cross-wise or perpendicular relationship with one another. At the junction between the two ducts there is provided an interconnecting opening or passage. Each of the ducts have a pair of conductors substantially coaxially positioned therein and supported by insulation blocks. A contact switching means is operably arranged in the inter-connecting opening and provides shortcircuiting between the required conductor from each of the cross-wise mounted ducts.

Figure 1:
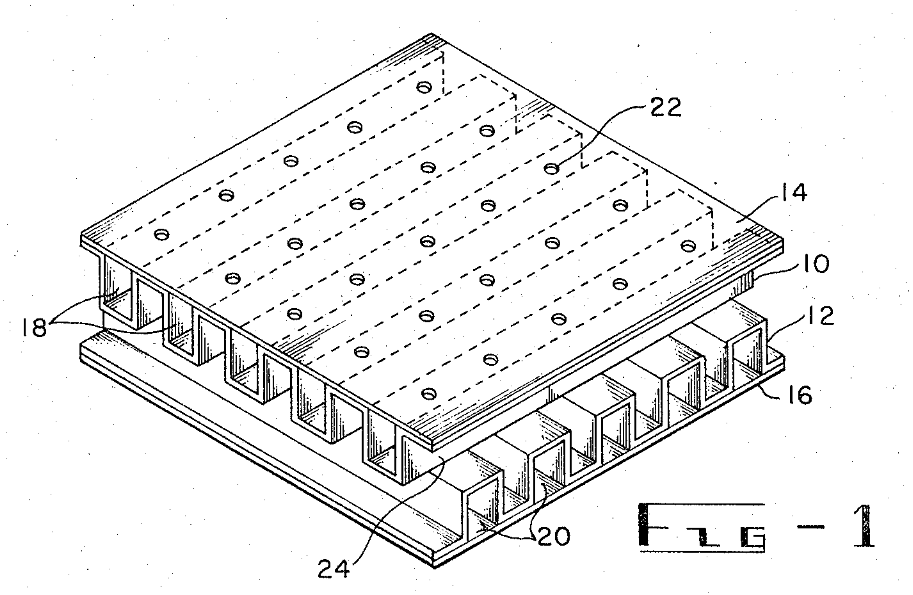
Figure 2:
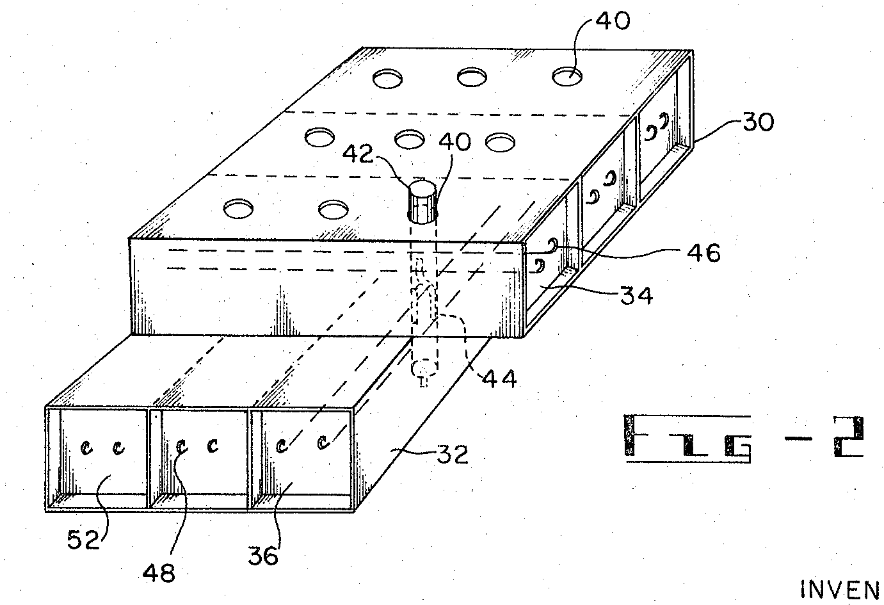

Referring now to the drawings wherein like reference characters designate corresponding parts throughout the figures, there are shown in FIGURE 1 and FIGURE 2 two preferred embodiments for manufacturing the X-Y grid type matrix switch structure.

The basic construction of the matrix switch involves a multiplicity of metallic tubes, round, square, or rectangular, the number being dependent on the switching capacity desired, which are structurally and electrically bonded together to form an integral assembly consisting of two groups of parallel passages. The major axis of each group of passages being oriented 90° relative to the other in a grid cross-over arrangement.

In FIGURE 1 there is shown two sheets of channel type of material 10 and 12 respectively covered on each side by a sheet 14 and 16 of the same conductive shielding material. A plurality of first passages 18 are oriented perpendicularly with a plurality of parallel passages 20. Holes 22 are provided normal to each cross-over junction 24.

In FIGURE 2 there is shown another embodiment of the structural assembly comprising a plurality of square tubes 30 perpendicularly and integrally mounted with a plurality of square tubes 32. The tubes 30 provide a plurality of passages 34 which are oriented perpendicularly to the passages 36 of tubes 32. At the cross-over junction of each said perpendicular passage there is provided an interconnecting passage 40 extending through the assembly. A quill or spindle 42 is movably mounted within said interconnecting passage 40 and provided with contact strips 44 for shortcircuiting of the pair of upper line conductors 46 with the pair of under line conductors 48 in the assembly.

Figure 3:
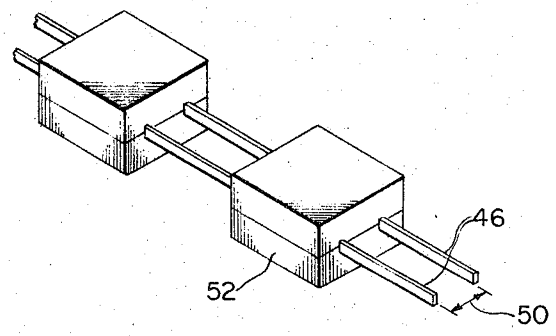

In FIGURE 3 there is shown a pair of conductors 46 being spaced from one another at a required distance 50 and supported by insulation blocks 52 of a material such as Micarta, plastic or any other required insulation material.

Figure 4:
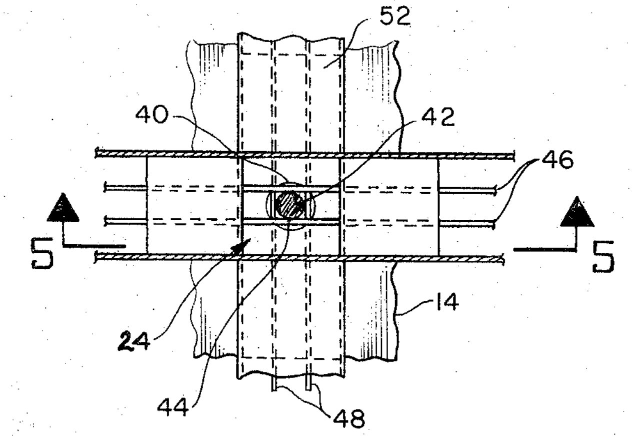
FIGURE 4 is a plan view of the assembled tubes or channel structure showing in particular the spindle contact switch at the cross-over junction.
Figure 5:
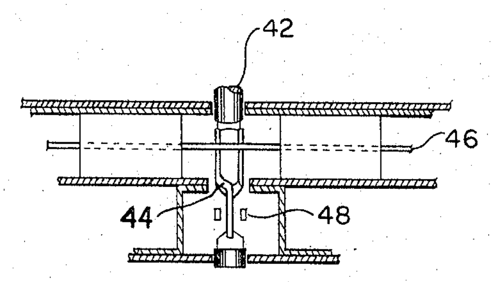
FIGURE 5 is a cross-section taken from FIGURE 4 along line 5—5.

In FIGURE 4 and FIGURE 5 there is shown a plan view and a cross-section view of the cross-over junction 24 of the X and Y passages respectively. As shown in the plan view the pair of conductors 46 are forming a square-shaped perpendicular intersection with the conductors 48 as seen in the plan view of FIGURE 5. The spindle 42 is movably mounted in the interconnecting passage 40 and capable of shortcircuiting conductor 46 with conductor 48 through the metal-conducting strip 44. In FIGURE 5 the switch spindle 42 is shown in a non-contacting position.

Figure 6:
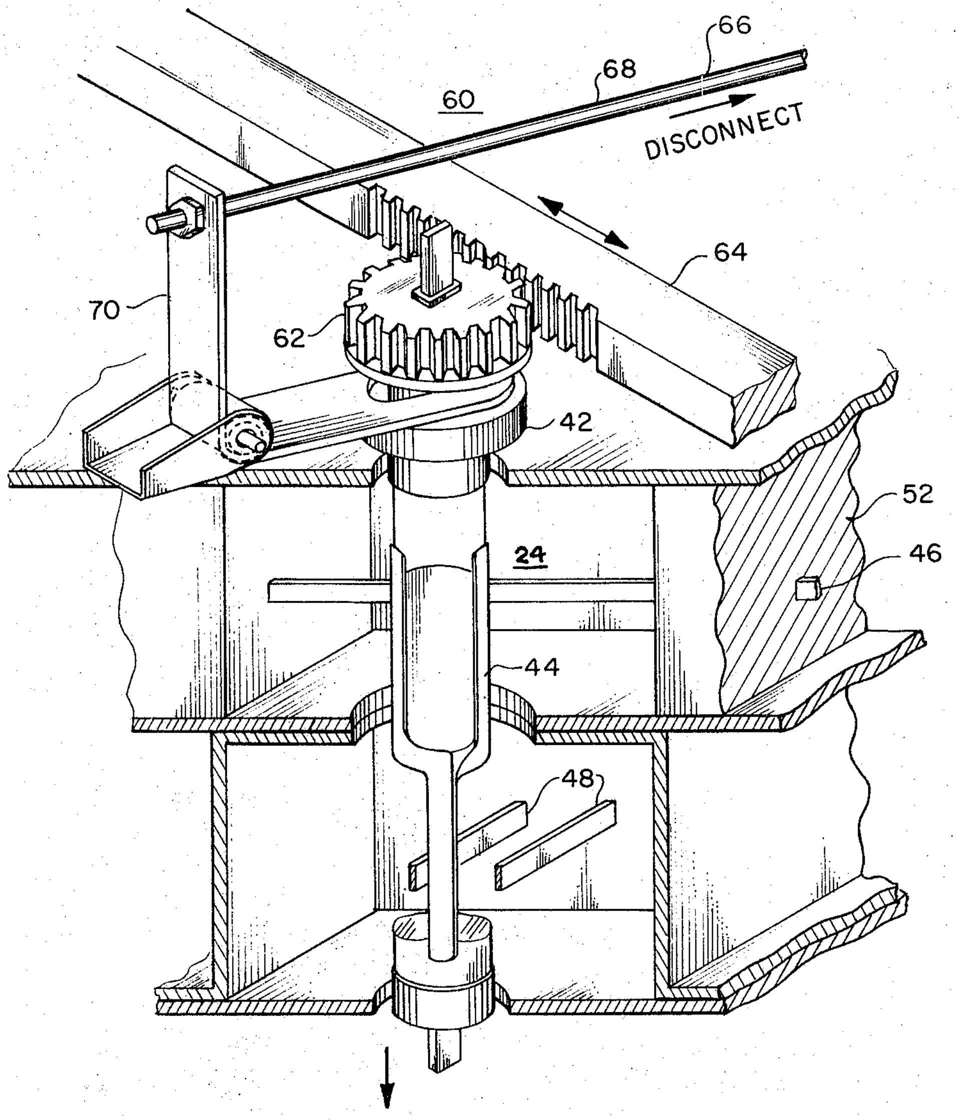
FIGURE 6 shows a cut-away section of an isometric view of the spindle switch arrangement at the junction within the X-Y tube assembly as well as the outside actuating mechanism for rotating the spindle switch.

The operation of the switching device 42 is clearly shown in FIGURE 6 where the cross-over junction 24 of the passageways in the X and Y direction is shown in a cutaway isometric illustration. An activating mechanism 60 is connected with the spindle 42 and comprises a gear 62 in meshing relationship with a reciprocal moving member 64. In order to electrically connect the pair of conductors 46 with the pair of conductors 48, coaxial movement of member 64 is necessary. When connecting selectively, a certain amount of switches on a matrix switching network while keeping a certain amount of switches disconnected or inactivated, the activating means or mechanism 60 of each switch 42, is provided with a disconnecting device 66. Device 66 comprises a rod 68 connected to a pivotally mounted disengaging member 70 which holds gear 62 engaged with member 64. For disconnecting purposes the rod 68 is moved into the direction indicated by the "arrow" which enables the spindle to move downwards and disengage gear 66 from member 64 so that an electrical connection by movement of member 64 cannot be made at this particular junction.

It should be understood that either the metal strips 44 of spindle 42 are of a spring resilient nature or that the stiffness of the pair of conductors 46 and 48 are of a resilient nature so that a reliable, electrical contact is made between the X and Y oriented conductor lines 46 and 48 respectively.

It should be further understood that the small, interconnecting orifices or interconnecting passage ways, oriented normal to the crossed axes of both groups of passages, at each junction 24, permit the establishment of electrical continuity between the respective circuit elements contained therein by means of mechanical switching contact means or by solid state devices, fluid conductors, conductive particles, etc. The outstanding feature of this concept, as opposed to other matrix switches, is the ability to maintain minimum intercircuit coupling regardless of the interconnect mechanism employed.

Prototype tests indicated at 15 db improvement over isolation figures given for other switch designs currently available for this purpose.

Although various minor structural modifications might be suggested to the preferred embodiments herein described by way of demonstrative example only, it should be understood that many changes could be effected without departing from the spirit of the present invention, and, accordingly, it should be further understood that the inventors wished to enclose within the scope of the patent warranted hereon all such modifications as reasonably and properly come within the scope of the inventors' contributions to the art.

We claim:

1. Anti-crosstalk switching mechanism comprising:
at least two ducts of conductive material mounted in crosswise relationship with one another,
said two ducts being provided with an interconnecting opening at said crosswise location,
a pair of conductors being supported in spaced relationship in each of said ducts,
a switching contact device extending through said opening for rotatable movement,
and said switching contact device comprising a pair of electrical contact means for electrically contacting and connecting each individual one of said conductors in one of said ducts to a corresponding one of each of said conductors in said other duct in one rotative position and to electrically disconnect said corresponding conductors in each of said ducts in a second rotative position.

2. An anti-crosstalk switching mechanism as claimed in claim 1 in which,
said electrical contact means comprising a pair of contact conductors being insulated from each other and being aligned in one plane in one of said ducts and in a plane normal to said one plane in the other of said ducts.

3. An anti-crosstalk switching mechanism as claimed in claim 2 including,
gear actuated means for positively rotating said switching contact device between said connect and disconnect positions.

4. An anti-crosstalk switching mecanism as claimed in claim 3 including,
clutch means for selectively disengaging said gear actuated means.

References Cited by the Examiner

UNITED STATES PATENTS

| | | | |
|---|---|---|---|
| 3,127,484 | 3/1964 | Hansen | 200—46 |
| 3,207,871 | 9/1965 | Dally | 200—46 X |
| 3,211,847 | 10/1965 | Johnson | 200—5 |
| 3,231,693 | 1/1966 | McLaughlin et al. | 200—46 X |

ROBERT K. SCHAEFER, *Primary Examiner.*

J. R. SCOTT, *Assistant Examiner.*